US009971958B2

United States Patent
Liu et al.

(10) Patent No.: US 9,971,958 B2
(45) Date of Patent: May 15, 2018

(54) METHOD AND SYSTEM FOR GENERATING MULTIMODAL DIGITAL IMAGES

(71) Applicant: Mitsubishi Electric Research Laboratories, Inc., Cambridge, MA (US)

(72) Inventors: Ming-Yu Liu, Revere, MA (US); Oncel Tuzel, Cupertino, CA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days. days.

(21) Appl. No.: 15/189,075

(22) Filed: Jun. 22, 2016

(65) Prior Publication Data
US 2017/0351935 A1   Dec. 7, 2017

Related U.S. Application Data

(60) Provisional application No. 62/344,331, filed on Jun. 1, 2016.

(51) Int. Cl.
| | |
|---|---|
| *G06K 9/00* | (2006.01) |
| *G06K 9/62* | (2006.01) |
| *G06N 3/08* | (2006.01) |
| *G06N 3/04* | (2006.01) |
| *G06T 11/60* | (2006.01) |

(52) U.S. Cl.
CPC ......... *G06K 9/6256* (2013.01); *G06K 9/6267* (2013.01); *G06N 3/0454* (2013.01); *G06N 3/084* (2013.01); *G06T 11/60* (2013.01)

(58) Field of Classification Search
CPC ........................... G06K 9/6256; G06N 3/0454
See application file for complete search history.

(56) References Cited

U.S. PATENT DOCUMENTS

| | | | |
|---|---|---|---|
| 6,654,018 B1 | 11/2003 | Cosatto et al. | |
| 7,876,320 B2 | 1/2011 | Marugame | |
| 2004/0103095 A1* | 5/2004 | Matsugu | G06K 9/00281 |
| 2016/0052452 A1* | 2/2016 | Oh | G06K 9/00369 |
| | | | 348/148 |
| 2016/0093048 A1* | 3/2016 | Cheng | G06T 7/30 |
| | | | 382/131 |
| 2016/0260014 A1* | 9/2016 | Hagawa | G06K 9/4628 |

(Continued)

OTHER PUBLICATIONS

Goodfellow et al. Generative Adversarial Nets. Jun. 10, 2014. https://arxiv.org/abs/1406.2661.

*Primary Examiner* — Oneal R Mistry
(74) *Attorney, Agent, or Firm* — Gene Vinokur; James McAleenan; Hironori Tsukamoto

(57) ABSTRACT

A computer-implemented method generates a multimodal digital image by processing a vector with a first neural network to produce a first modality of the digital image and processing the vector with a second neural network to produce a second modality of the digital image. A structure and a number of layers of the first neural network are identical to a structure and a number of layers of the second neural network. Also, at least one layer in the first neural network has parameters identical to parameters of a corresponding layer in the second neural network, and at least one layer in the first neural network has parameters different from parameters of a corresponding layer in the second neural network.

17 Claims, 18 Drawing Sheets

(56) References Cited

U.S. PATENT DOCUMENTS

2016/0307071 A1* 10/2016 Perronnin ............ G06K 9/4628
2017/0032222 A1* 2/2017 Sharma ................ G06K 9/6256
2017/0098141 A1* 4/2017 Wang ................... G06K 9/6828

* cited by examiner

1: Initialize the network parameters $\theta_{f_1^{(i)}}$'s, $\theta_{f_2^{(i)}}$'s and $\theta_{g_1^{(i)}}$'s, $\theta_{g_2^{(i)}}$'s with the shared parameters set to same values.
2: for $t = 0, 1, 2, \ldots,$ maximum iterations do
3:  Draw $N$ samples from $p_z$, $\{z^1, z^2, \ldots, z^N\}$
4:  Draw $N$ samples from $p_{X_1}$, $\{x_1^1, x_1^2, \ldots, x_1^N\}$
5:  Draw $N$ samples from $p_{X_2}$, $\{x_2^1, x_2^2, \ldots, x_2^N\}$
6:  Compute the stochastic gradient for the parameters of the discriminative model $f_1$, $\Delta\theta_{f_1^{(t)}}$:

$$\nabla_{\theta_{f_1^{(t)}}} \frac{1}{N} \sum_{j=1}^{N} -\log f_1^t(x_1^j) - \log\left(1 - f_1^t(g_1^t(z^j))\right)$$

7:  Compute the stochastic gradient for the parameters of the discriminative model $f_2$, $\Delta\theta_{f_2^{(t)}}$:

$$\nabla_{\theta_{f_2^{(t)}}} \frac{1}{N} \sum_{j=1}^{N} -\log f_2^t(x_2^j) - \log\left(1 - f_2^t(g_2^t(z^j))\right)$$

8:  Compute the stochastic gradient of the shared network parameters of the discriminative models by averaging the individual stochastic gradients.
9:  Compute $f_1^{t+1}$ and $f_2^{t+1}$ according to the stochastic gradients.
10: Compute the stochastic gradient for the parameters of the generative model $g_1$, $\Delta\theta_{g_1^{(t)}}$:

$$\nabla_{\theta_{g_1^{(t)}}} \frac{1}{N} \sum_{j=1}^{N} -\log\left(1 - f_1^{t+1}(g_1^t(z^j))\right)$$

11: Compute the stochastic gradient for the network parameters of the generative model $g_2$, $\Delta\theta_{g_2^{(t)}}$:

$$\nabla_{\theta_{g_2^{(t)}}} \frac{1}{N} \sum_{j=1}^{N} -\log\left(1 - f_2^{t+1}(g_2^t(z^j))\right)$$

12: Compute the stochastic gradient of the shared parameters of the generative models by averaging the individual stochastic gradients.
13: Compute $g_1^{t+1}$ and $g_2^{t+1}$ according to the stochastic gradients.
14: end for

| | Generative models | | |
|---|---|---|---|
| Layer | Domain 1 | Domain 2 | Shared? |
| 1 | FCONV-(N1024,K4x4,S1), BN, PReLU | FCONV-(N1024,K4x4,S1), BN, PReLU | Yes |
| 2 | FCONV-(N512,K3x3,S2), BN, PReLU | FCONV-(N512,K3x3,S2), BN, PReLU | Yes |
| 3 | FCONV-(N256,K3x3,S2), BN, PReLU | FCONV-(N256,K3x3,S2), BN, PReLU | Yes |
| 4 | FCONV-(N128,K3x3,S2), BN, PReLU | FCONV-(N128,K3x3,S2), BN, PReLU | Yes |
| 5 | FCONV-(N1,K6x6,S1), Sigmoid | FCONV-(N1,K6x6,S1), Sigmoid | No |

| | Discriminative models | | |
|---|---|---|---|
| Layer | Domain 1 | Domain 2 | Shared? |
| 1 | CONV-(N20,K5x5,S1), POOL-(MAX,2) | CONV-(N20,K5x5,S1), POOL-(MAX,2) | No |
| 2 | CONV-(N50,K5x5,S1), POOL-(MAX,2) | CONV-(N50,K5x5,S1), POOL-(MAX,2) | Yes |
| 3 | FC-(N500), PReLU | FC-(N500), PReLU | Yes |
| 4 | FC-(N1), Sigmoid | FC-(N1), Sigmoid | Yes |

FIG. 6A

Generative models

| Layer | Domain 1 | Domain 2 | Shared? |
|---|---|---|---|
| 1 | FCONV-(N1024,K4x4,S1), BN, PReLU | FCONV-(N1024,K4x4,S1), BN, PReLU | Yes |
| 2 | FCONV-(N512,K4x4,S2), BN, PReLU | FCONV-(N512,K4x4,S2), BN, PReLU | Yes |
| 3 | FCONV-(N256,K4x4,S2), BN, PReLU | FCONV-(N256,K4x4,S2), BN, PReLU | Yes |
| 4 | FCONV-(N128,K4x4,S2), BN, PReLU | FCONV-(N128,K4x4,S2), BN, PReLU | Yes |
| 5 | FCONV-(N64,K4x4,S2), BN, PReLU | FCONV-(N64,K4x4,S2), BN, PReLU | Yes |
| 6 | FCONV-(N32,K4x4,S2), BN, PReLU | FCONV-(N32,K4x4,S2), BN, PReLU | No |
| 7 | FCONV-(N3,K3x3,S1), TanH | FCONV-(N3,K3x3,S1), TanH | No |

Discriminative models

| Layer | Domain 1 | Domain 2 | Shared? |
|---|---|---|---|
| 1 | CONV-(N32,K5x5,S2), BN, PReLU | CONV-(N32,K5x5,S2), BN, PReLU | No |
| 2 | CONV-(N64,K5x5,S2), BN, PReLU | CONV-(N64,K5x5,S2), BN, PReLU | No |
| 3 | CONV-(N128,K5x5,S2), BN, PReLU | CONV-(N128,K5x5,S2), BN, PReLU | Yes |
| 4 | CONV-(N256,K3x3,S2), BN, PReLU | CONV-(N256,K3x3,S2), BN, PReLU | Yes |
| 5 | CONV-(N512,K3x3,S2), BN, PReLU | CONV-(N512,K3x3,S2), BN, PReLU | Yes |
| 6 | CONV-(N1024,K3x3,S2), BN, PReLU | CONV-(N1024,K3x3,S2), BN, PReLU | Yes |
| 7 | FC-(N2048), BN, PReLU | FC-(N2048), BN, PReLU | Yes |
| 8 | FC-(N1), Sigmoid | FC-(N1), Sigmoid | Yes |

Generative models

| Layer | Domain 1 | Domain 2 | Shared? |
|---|---|---|---|
| 1 | FCONV-(N1024,K4x4,S1), BN, PReLU | FCONV-(N1024,K4x4,S1), BN, PReLU | Yes |
| 2 | FCONV-(N512,K4x4,S2), BN, PReLU | FCONV-(N512,K4x4,S2), BN, PReLU | Yes |
| 3 | FCONV-(N256,K4x4,S2), BN, PReLU | FCONV-(N256,K4x4,S2), BN, PReLU | Yes |
| 4 | FCONV-(N128,K4x4,S2), BN, PReLU | FCONV-(N128,K4x4,S2), BN, PReLU | Yes |
| 5 | FCONV-(N64,K4x4,S2), BN, PReLU | FCONV-(N64,K4x4,S2), BN, PReLU | Yes |
| 6 | FCONV-(N32,K3x3,S1), BN, PReLU | FCONV-(N32,K3x3,S1), BN, PReLU | No |
| 7 | FCONV-(N3,K3x3,S1), TanH | FCONV-(N1,K3x3,S1), Sigmoid | No |

Discriminative models

| Layer | Domain 1 | Domain 2 | Shared? |
|---|---|---|---|
| 1 | CONV-(N32,K5x5,S2), BN, PReLU | CONV-(N32,K5x5,S2), BN, PReLU | No |
| 2 | CONV-(N64,K5x5,S2), BN, PReLU | CONV-(N64,K5x5,S2), BN, PReLU | No |
| 3 | CONV-(N128,K5x5,S2), BN, PReLU | CONV-(N128,K5x5,S2), BN, PReLU | Yes |
| 4 | CONV-(N256,K3x3,S2), BN, PReLU | CONV-(N256,K3x3,S2), BN, PReLU | Yes |
| 5 | CONV-(N512,K3x3,S2), BN, PReLU | CONV-(N512,K3x3,S2), BN, PReLU | Yes |
| 6 | CONV-(N1024,K3x3,S2), BN, PReLU | CONV-(N1024,K3x3,S2), BN, PReLU | Yes |
| 7 | FC-(N2048), BN, PReLU | FC-(N2048), BN, PReLU | Yes |
| 8 | FC-(N1), Sigmoid | FC-(N1), Sigmoid | Yes |

FIG. 8A

METHOD AND SYSTEM FOR GENERATING MULTIMODAL DIGITAL IMAGES

FIELD OF THE INVENTION

This invention relates generally to image synthesis and more particularly to generating multimodal digital images using neural networks.

BACKGROUND

Pair image generation refers to generating a pair of corresponding images in two different modalities such as a face with different attributes, a character in different fonts, or a color image and the corresponding depth image. The multimodal image generation refers to generating a pair or more of corresponding images of different modalities. The generation of multimodal images has a wide range of applications. For example, the multimodal images can be applied to render novel pairs of corresponding images for movies and computer games. For example, a method described in U.S. Pat. No. 7,876,320 synthesizes two or more face images, or at least one face image and one face graphics or a face animation to thereby create a fictional face image.

A number of methods use one-to-one correspondences between images in different modalities to generate a multimodal digital image. Examples of those methods include a deep multi-modal Boltzmann method and a coupled dictionary learning method. Some methods can use physical models to generate corresponding images in the two different modalities such as image super-resolution or image deblurring. However, in general case, determining the one-to-one correspondences between images in different modalities is challenging.

Accordingly, there is a need to generate a multimodal digital image without relying on one-to-one correspondence between different modalities in the training data.

SUMMARY

Some embodiments of the invention provide a set of the neural networks jointly trained to produce different modalities of a digital image. For example, one embodiment provides a set of neural networks, which can render a set of corresponding images in different modalities without the existence of one-to-one correspondence between different modalities of the digital image.

Some embodiments are based on realization that when neural networks are trained independently to generate a digital image, the generated digital images are not related. However, by forcing, e.g., during the joint training, a weight sharing constraint on the neural networks, the neural networks can be trained to generate a multimodal digital image. For example, one embodiment generates a multimodal digital image using a first neural network trained to produce a first modality of the digital image and a second neural network trained to produce a second modality of the digital image. The structure and number of layers of the first neural network are identical to the structure and number of layers of the second neural network. Also, at least one layer in the first neural network has parameters identical to parameters of a corresponding layer in the second neural network and at least one layer in the first neural network has parameters different from parameters of a corresponding layer in the second neural network.

In such a manner, the identical structure as well as the number and identical value of some parameters of the neural networks force some commonality in the generated digital images, while the different values of other parameters of the neural networks enforce the differences in the modalities. For example, in one embodiment, some layers of the first and the second neural networks have identical parameters to produce high-level features of the digital image, while the other layers of the first and the second neural networks have different parameters to produce low-level features of the digital image. Typically, the low-level features are derived from the high-level features. For example, the high-level features can be a description of types and configurations of the objects in the image, and the low-level features can be edges of the objects determined based on the types and configurations of the objects.

Accordingly, one embodiment discloses a computer-implemented method for generating a multimodal digital image. The method includes processing a vector with a first neural network to produce a first modality of the digital image; and processing the vector with a second neural network to produce a second modality of the digital image, wherein a structure and a number of layers of the first neural network are identical to a structure and a number of layers of the second neural network, wherein at least one layer in the first neural network has parameters identical to parameters of a corresponding layer in the second neural network, and wherein at least one layer in the first neural network has parameters different from parameters of a corresponding layer in the second neural network. The steps of the method are performed using a processor.

Another embodiment discloses a system for generating multimodal digital image, including at least one non-transitory computer readable memory storing a first neural network trained to produce a first modality of the digital image and a second neural network trained to produce a second modality of the digital image, wherein a structure and a number of layers of the first neural network are identical to a structure and a number of layers of the second neural network, wherein at least one layer in the first neural network has parameters identical to parameters of a corresponding layer in the second neural network, and wherein at least one layer in the first neural network has parameters different from parameters of a corresponding layer in the second neural network; and a processor to generate the multimodal digital image by processing a vector with the first neural network trained to produce a first modality of the digital image and processing the vector with the second neural network trained to produce a second modality of the digital image, and to store the multimodal digital image in the memory.

Yet another embodiment discloses a non-transitory computer-readable medium with instructions stored thereon, that when executed by a processor, perform the steps including processing a vector with a first neural network trained to produce a first modality of the digital image; and processing the vector with a second neural network trained to produce a second modality of the digital image, wherein a structure and a number of layers of the first neural network are identical to a structure and a number of layers of the second neural network, wherein at least one layer in the first neural network has parameters identical to parameters of a corresponding layer in the second neural network, and wherein at least one layer in the first neural network has parameters different from parameters of a corresponding layer in the second neural network.

BRIEF DESCRIPTION OF THE DRAWINGS

FIG. 5B is a pseudo code of the neural network training according to one embodiment;

FIG. 6A is an example of a structure of generative and discriminative subnetworks for generating multimodal digital images of handwritten digits according to one embodiment;

FIG. 7A is an example of a structure of generative and discriminative subnetworks for generating multimodal face images with different attributes according to one embodiment;

FIG. 8A is an example of a structure of generative and discriminative subnetworks for generating multimodal digital images including color images and its corresponding depth images according to one embodiment;

DETAILED DESCRIPTION

Figure 1:
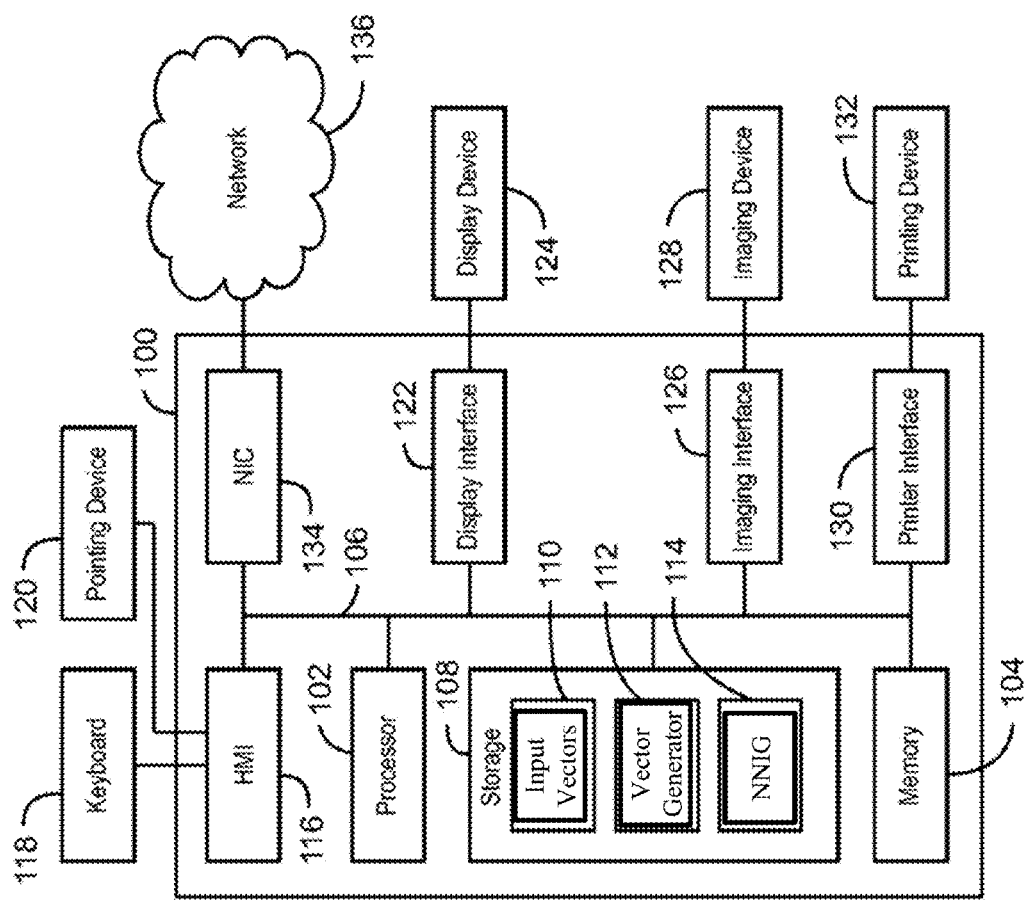
FIG. 1 is a block diagram of a computer system for generating a multimodal digital image in accordance with some embodiments of the invention.

FIG. 1 shows a block diagram of a computer system 100 for generating a multimodal digital image in accordance with some embodiments of the invention. As used herein, the multimodal digital image is structural digital data having different modalities. For example, the multimodal digital image can include a first image having a first modality and a second image having a second modality. Different modalities can represent different styles or types of data that form the digital image. Examples of different digital images having different modalities include color images, depth images, and thermal images. In some embodiments, the digital image is structural digital data of one or combination of different formats. For example, the digital image can include one or combination of an image, a video, a text, and a sound.

The different modalities of the digital image usually form different images of different types representing the same or at least similar structural information. To that end, the images of different modalities forming the multimodal digital image are related. For example, the first modality of the digital image can be a first image of a text depicted in one style, and the second modality of the digital image can be a second image of the same text but depicted in different style. For example, the first modality of the digital image can be a first image of a face of a person wearing glasses, and the second modality of the digital image can be a second image of the same face of the person not wearing the glasses. For example, the first modality of the digital image can be an image that includes color information for each pixel to represent a scene, and the second modality of the digital image that includes depth information for each pixel to represent the same scene.

The computer system 100 includes a processor 102 configured to execute stored instructions, as well as a memory 104 that stores instructions that are executable by the processor. The processor 102 can be a single core processor, a multi-core processor, a computing cluster, or any number of other configurations. The memory 104 can include random access memory (RAM), read only memory (ROM), flash memory, or any other suitable memory systems. The processor 102 is connected through a bus 106 to one or more input and output devices.

The computer system 100 includes a neural network image generator (NNIG) 114 for generating the multimodal digital images. The NNIG 114 is implemented using a set of neural network, e.g., a first neural network and a second neural network, jointly trained to generate the multimodal digital image. For example, the first and the second neural networks can accept the same input and generate the multimodal digital image, in which the first neural network generates the first modality of the digital image and the second neural network generates the second modality of the digital image. The NNIG 114 can be stored in the memory of the system 100.

The computer system 100 can also include a storage device 108 adapted to store supplementary data and/or software modules used by the NNIG 114. For example, the storage device 108 can store input vectors 110 used by the NNIG 114 to generate the multimodal digital image. Additionally or alternatively, the storage device 108 can store a vector generator 112 for generating vectors 110. For example, the vector generator 112 can be implemented using the processor 102 or any other suitable processor. The vectors 110 can have different or even arbitrarily values. For example, the vector generator 112 can randomly generate elements of the vector using a probabilistic distribution. The storage device 108 can also store the structure and parameters of the NNIG 114. The storage device 108 can include a hard drive, an optical drive, a thumb-drive, an array of drives, or any combinations thereof.

A human machine interface 116 within the computer system 100 can connect the system to a keyboard 118 and pointing device 120, wherein the pointing device 120 can include a mouse, trackball, touchpad, joy stick, pointing stick, stylus, or touchscreen, among others. The computer system 100 can be linked through the bus 106 to a display interface 122 adapted to connect the system 100 to a display device 124, wherein the display device 124 can include a computer monitor, camera, television, projector, or mobile device, among others.

The computer system 100 can also be connected to an imaging interface 126 adapted to connect the system to an imaging device 128. The imaging device 128 can include a camera, computer, scanner, mobile device, webcam, or any combination thereof. A printer interface 130 can also be connected to the computer system 100 through the bus 106 and adapted to connect the computer system 100 to a printing device 132, wherein the printing device 132 can include a liquid inkjet printer, solid ink printer, large-scale commercial printer, thermal printer, UV printer, or dye-sublimation printer, among others. A network interface controller 134 is adapted to connect the computer system 100 through the bus 106 to a network 136. The multimodal digital image can be rendered on a display device, imaging device, and/or printing device. The multimodal digital image can be transmitted over a communication channel of the network 136, and/or stored within the computer's storage system 108 for storage and/or further processing.

Figure 2A:
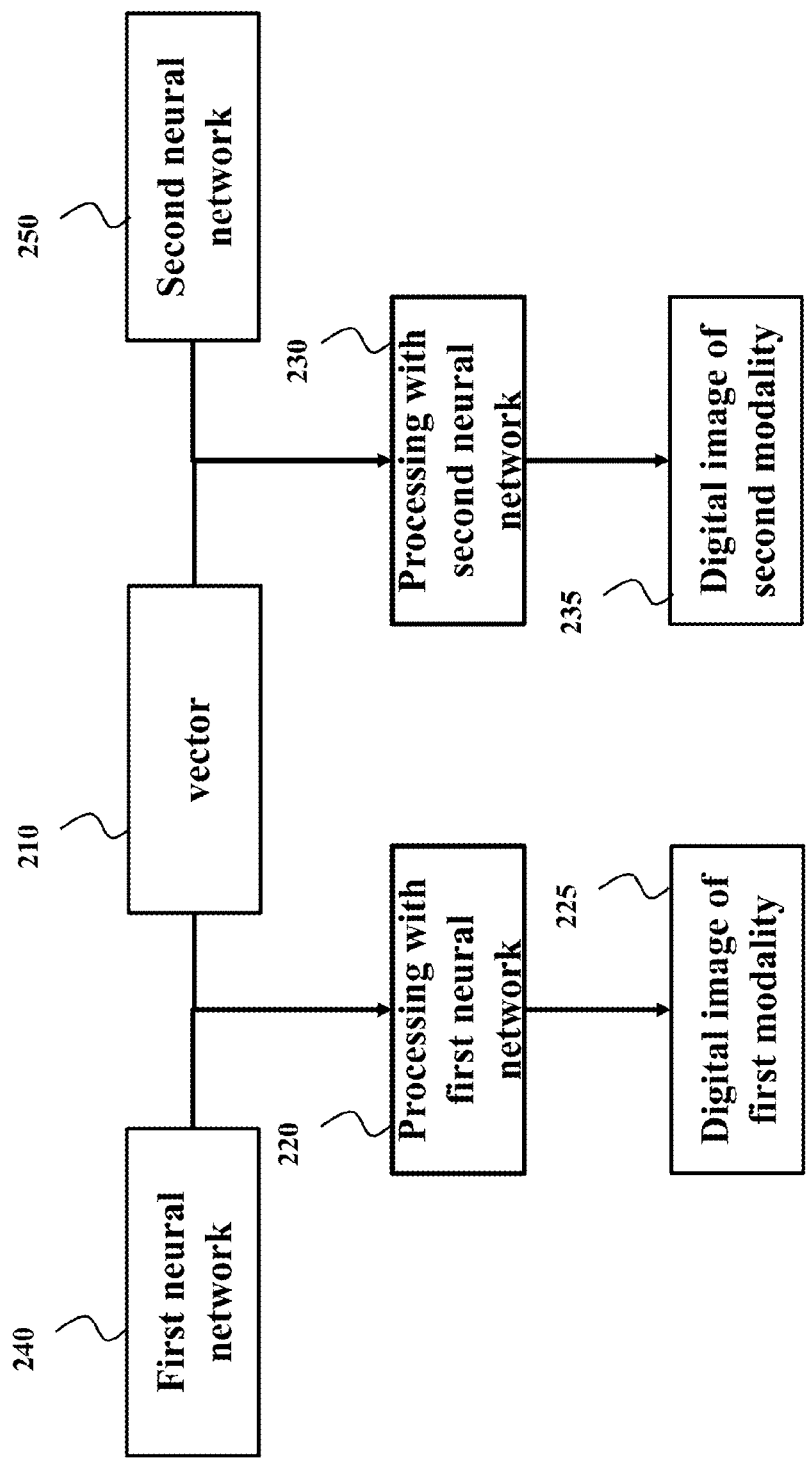
FIG. 2A is a block diagram of a computer-implemented method for generating a multimodal digital image according to one embodiment.

FIG. 2A shows a block diagram of a computer-implemented method for generating a multimodal digital image according to one embodiment of the invention. The method processes 220 a vector 210 with a first neural network 240 to produce a first modality 225 of the digital image and processes 230 the vector 210 with a second neural network 250 to produce a second modality 235 of the digital image. The method can be performed using the NNIG 114 and executed using a processor of the computer system 100, e.g., the processor 102.

Some embodiments are based on realization that when neural networks are trained independently to generate an image, the generated images are not related. However, by forcing a weight sharing constraint in the neural networks, and given sufficient training images in each modality, the neural networks can be jointly trained to generate a multimodal digital image.

Figure 2B:
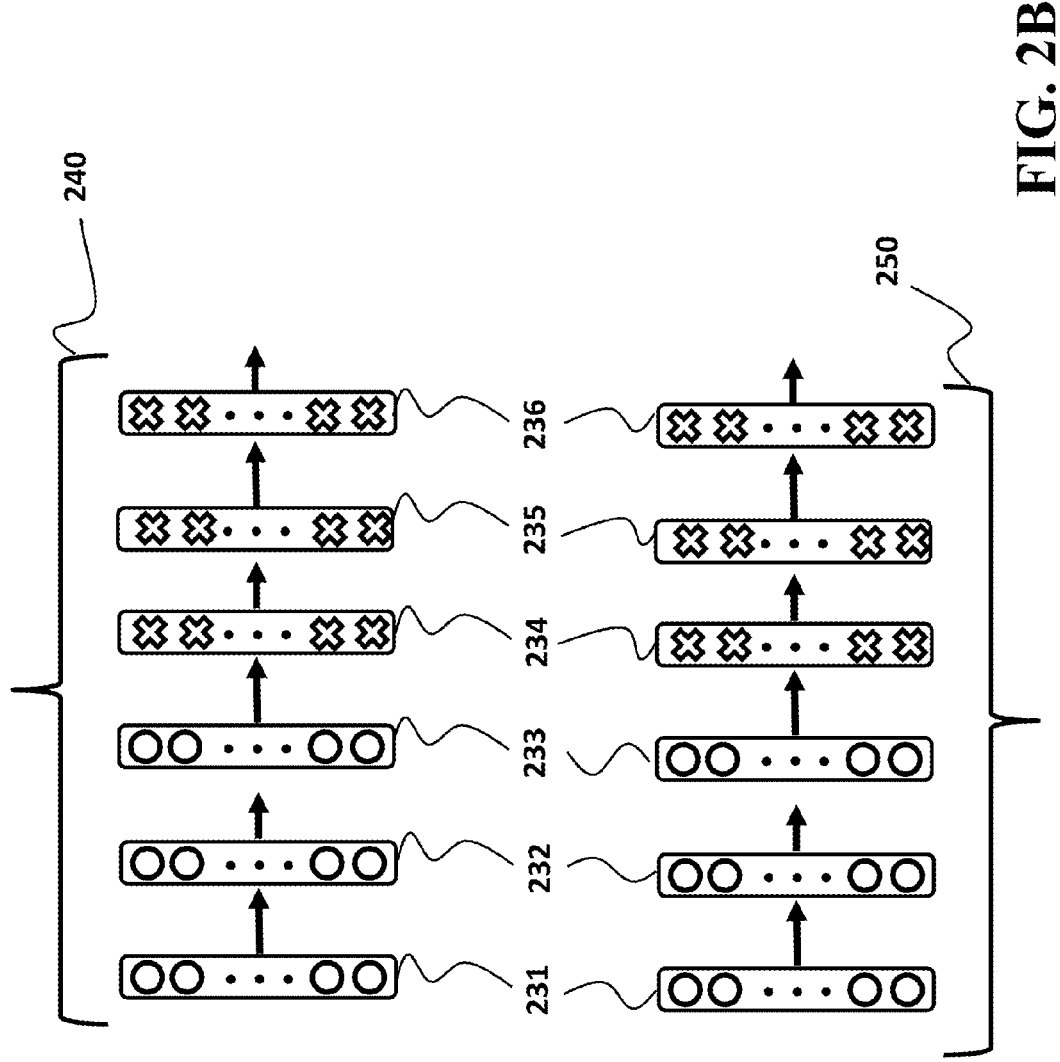
FIG. 2B is an exemplar schematic of the structure neural networks for generating multimodal digital image according to one embodiment of the invention.

FIG. 2B shows an exemplar schematic of the structure of the first neural network 240 trained to produce a first modality of the digital image and the structure of the second neural network 250 trained to produce a second modality of the digital image. The structure, e.g., the number of layers and connection among layers, of the first neural network are identical to the structure of the second neural network. Additionally, at least one layer in the first neural network has parameters identical to parameters of a corresponding layer in the second neural network. However, at least one layer in the first neural network has parameters different from parameters of a corresponding layer in the second neural network. In the example of FIG. 2B, the layers 231, 232, 233, 234, 235, and 236 are shown. The corresponding layers 231, 232, and 233 have the same parameters, while the corresponding layers 234, 235, and 246 have different parameters.

Typically, the layers with identical parameters are the top layers to enforce the high-level features of the images. For example, the both networks are trained jointly while enforcing identical parameters for several top layers of the first neural network and the second neural network. In such a manner, the identical structure identical parameters of the networks force some commonality in the generated images, while the different parameters of at least some layers of the networks enforce the different modalities. For example, in one embodiment, the layers of the first and the second neural networks that have identical parameters produce high-level features of the digital image, and the layers of the first and the second neural networks that have different parameters produce low-level features of the digital image. Typically, the low-level features are derived from the high-level features. For example, the high-level features can be a description of types and configurations of the objects in the image, and the low-level features can be edges of the objects determined based on the types and configurations of the objects.

Coupled Generative Adversarial Nets

Some embodiments of the invention use a coupled generative adversarial nets (CoGAN) framework to train the NNIG 114, which can render the multimodal digital image without the existence of one-to-one correspondence in the training dataset. The framework is based on the generative adversarial nets (GAN) for image generation. The CoGAN framework includes of at least a pair of GANs.

Each GAN is trained to generate images in one domain and the framework of the CoGAN forces each GAN to generate different images that are related to each other at least in one respect. For example, by forcing the layers that decode high level information in the two GANs to share the network connection weights, the two GANs decode the high level semantics in the same way. Then, the layers that decode low level visual information map the shared semantics to images of different modality for confusing the discriminative subnetworks for each modality. By forcing a weight sharing constraint in the generative subnetwork, and given sufficient training images in each domain, the CoGAN is trained to acquire the correspondence in the multiple modalities.

To that end, in some embodiments, at least one or both of the first neural network and the second neural network are trained using the adversarial training procedure. For example, a first generative subnetwork and a first discriminative subnetwork of the first neural network as well as a second generative subnetwork and a second discriminative subnetwork of the second neural network can be jointly trained to minimize a minimax objective function.

Generative Adversarial Nets

Figure 3:
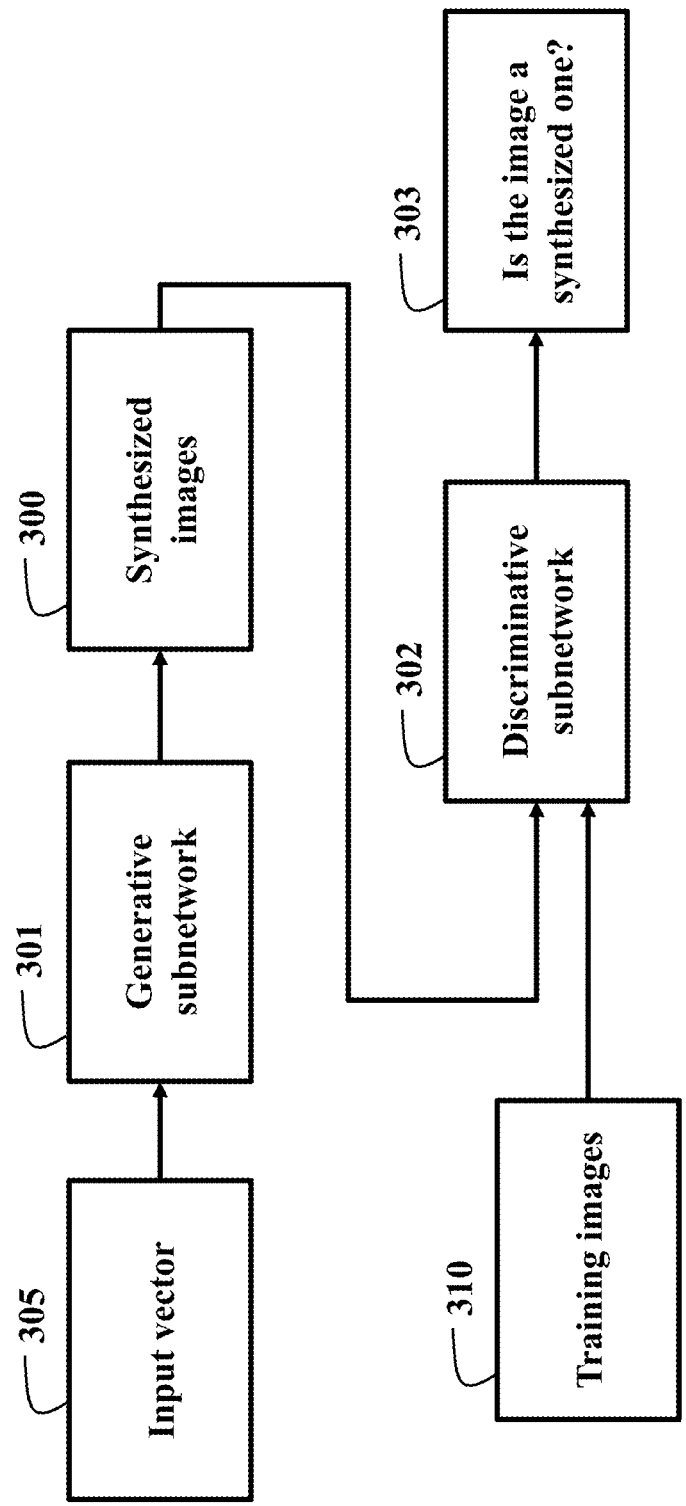
FIG. 3 is a block diagram of a neural network used by some embodiments.

FIG. 3 shows a block diagram of a GAN used by some embodiments to train the NNIG 114. The GAN framework includes two subnetworks, a generative subnetwork 301 and a discriminative subnetwork 302. The objective of the generative subnetwork 301 is to synthesize or generate images 300 resembling training images 310 from a random input 305, e.g., the vector 210. The objective of the discriminative subnetwork 302 is to distinguish 303 the images 310 from synthesized images 300. Both the generative and discriminative subnetworks can be implemented as multilayer perceptrons, i.e., feedforward neural network, or multilayer convolutional neural networks.

Formally, let $D_{GAN}$ be the training dataset, where each sample, x is drawn from a data distribution, $x:p_X$. Let z be a random vector of dimension d. In one embodiment, z is drawn from a multidimensional uniform distribution. Alternative embodiments use different distributions, such as the multidimensional normal distribution. Let g and $f$ be the generative and discriminative subnetworks, respectively. The function g takes z as input and output a random vector g(z), which has the same support as x. Denote the distribution of g(z) as $p_G$. The function $f$ estimates the probability that an input is drawn from $p_X$. Notably, $f(x)=1$ when x is from $p_X$ and $f(x)=0$ when x is from $p_G$.

By the way of analogy, the GAN framework corresponds to a minimax two-player game, and the generative and discriminative subnetworks can be trained jointly by solving:

$$\max_g \min_f V_{GAN}(f, g) \tag{1}$$

where the value function $V_{GAN}$ is given by $$V_{GAN}(f, g) = E_{x:p_X}[-\log f(x)] + E_{z:p_Z}[-\log(1 - f(g(z)))]. \tag{2}$$

A back-propagation algorithm with stochastic gradient descent is used to train the networks $f$ and $g$. In some embodiments, Equation (1) is solved by alternating the following two gradient update steps:

$$\text{Step1: } \theta_f^{t+1} = \theta_f^t - \lambda^t \nabla_{\theta_f} V_{GAN}(f^t, g^t) \quad (3)$$

$$\text{Step2: } \theta_g^{t+1} = \theta_g^t + \lambda^t \nabla_{\theta_g} V_{GAN}(f^{t+1}, g^t) \quad (4)$$

where $\theta_f$ and $\theta_g$ are the learnable network parameters of network $f$ and $g$, respectively, $\lambda$ is the learning rate, and the superscript t denotes the iteration number of gradient updates.

Given enough capacity to $f$ and $g$ and enough training iterations, the distribution $p_G$ converges to $p_X$. That is from a random seed, z, the network g can synthesize an image, g(z), that are similar to those drawn from the true data distribution, $p_X$. To that end, after the training, the generative subnetwork 301 can form a part of the NNIG 114.

Coupled Generative Adversarial Nets

Figure 4A:
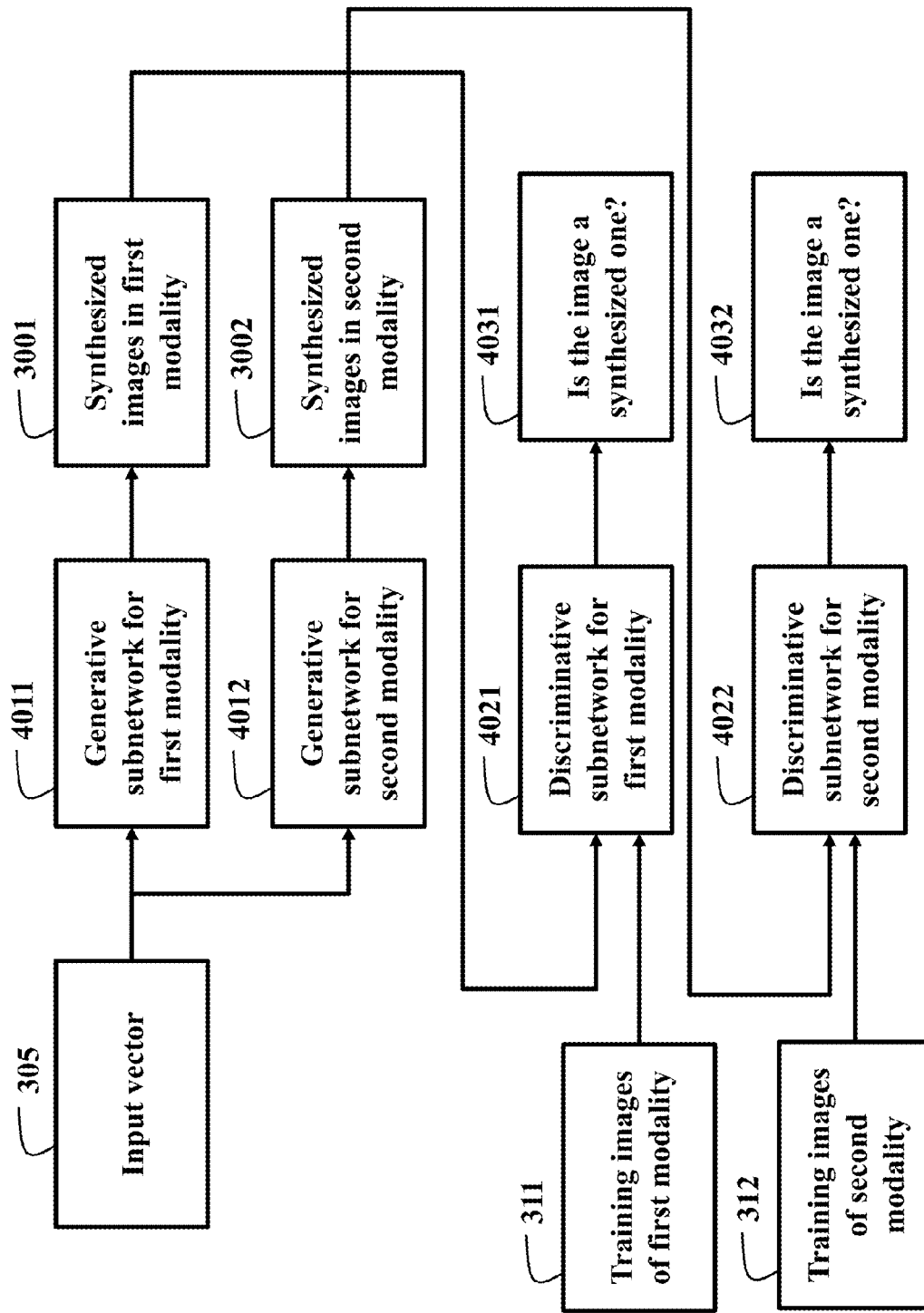
FIG. 4A is a schematic of coupled generative adversarial nets (CoGAN) framework according to some embodiments.

FIG. 4A shows the CoGAN framework according to some embodiments. The CoGAN includes a pair of generative adversarial nets: GAN1 and GAN2. Each of the generative adversarial nets has a generative subnetwork that can synthesize the images and a discriminative subnetwork that can classify whether an input signal is a real image or a synthesized image. The generative subnetworks for GAN1 and GAN2 are denoted by $g_1$ 4011 and $g_2$ 4012, while the discriminative subnetworks for GAN1 and GAN2 are denoted by $f_1$ 4021 and $f_2$ 4022. The subnetworks can be implemented as multilayer perceptrons.

The generative subnetwork 4011 is trained to generate images 3001 in the first modality from an input vector 305 and the generative subnetwork 401 is trained to generate images 3002 in the second modality from the input vector 305. To facilitate the training, the discriminative subnetwork 4021 distinguishes 4031 the images 3001 from the training images of the first modality 311. Similarly, the discriminative subnetwork 4022 distinguishes 4032 the images 3002 from the training images of the first modality 312.

Figure 4B:
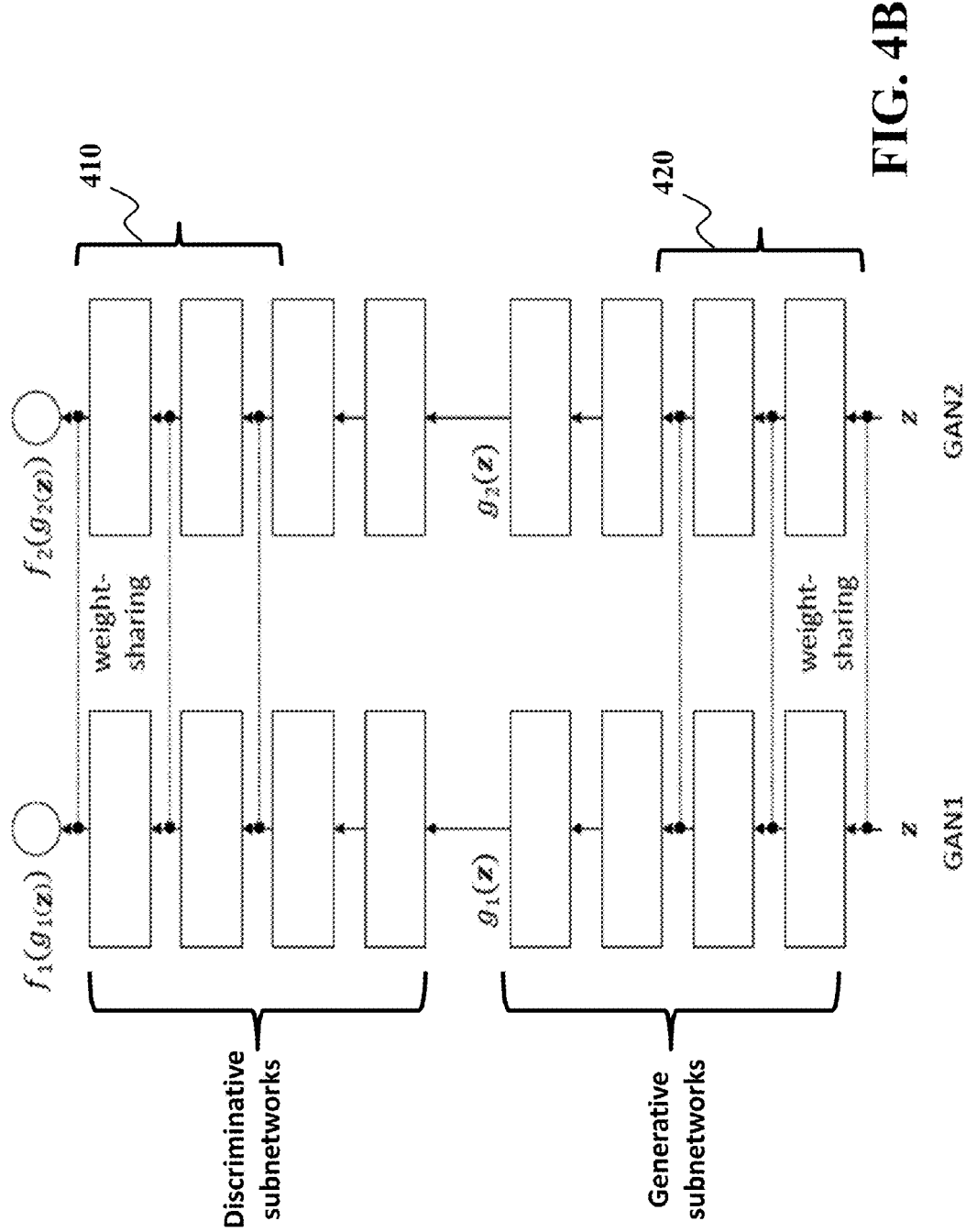
FIG. 4B is an example of the weight-sharing constraints in the CoGAN imposed by some embodiments.

FIG. 4B shows an example of the weight-sharing constraints in the coupled generative adversarial nets framework. In the CoGAN framework, the weights of the bottom layers 420 of generative subnetworks $g_1$ and $g_2$, i.e., the layers that corresponds to high-level semantic information, are constrained to have the identical weights, i.e., the identical parameters. In this example, the weights of the top layers 410 corresponding to the high-level semantic information of the discriminative subnetworks $f_1$ and $f_2$ are shared.

Notably, the generative and discriminative subnetworks are used mostly or even exclusively during the training stage. After the generative subnetwork is trained, the discriminative subnetwork can be discarded, and the generative subnetwork becomes the first 240 or the second 250 neural network.

This weight-sharing scheme forces GAN1 and GAN2 to synthesize pairs of corresponding images, where the correspondence is defined in the sense that the two images share the same high-level semantic information but have different low-level realization such as an image and its rotation or the face of a person with glasses and the face of the same person without glasses. For example, the CoGAN can be used to synthesize an image and its rotation or synthesize a face with glasses and the same face without glasses. The CoGAN framework can be extended to handle joint image generation in multiple modalities by simply adding more GANs.

Generative Subnetworks

Let $D_{DGAN}$ be the training dataset, where each sample is drawn either from the data distribution of the first modality, $x_1 : p_{X_1}$, or from the data distribution of the second modality, $x_2 : p_{X_2}$. Let $g_1$ and $g_2$ be the generative subnetworks of GAN1 and GAN2. The subnetworks individually map a random vector input z to images that have the same support as $x_1$ and $x_2$. Denote the distributions of $g_1(z)$ and $g_1(z)$ by $p_{G_1}$ and $p_{G_2}$.

In one embodiment, both of $g_1$ and $g_2$ are implemented as multilayer perceptrons and can be expressed as $$g_1(z) = g_1^{(m1)}(g_1^{(m1-1)}(\ldots g_1^{(2)}(g_1^{(1)}(z)))), \text{ and} \quad (5)$$

$$g_2(z) = g_2^{(m2)}(g_2^{(m2-1)}(\ldots g_2^{(2)}(g_2^{(1)}(z)))), \quad (6)$$

where $g_1^{(i)}$ and $g_2^{(i)}$ are the ith layers of $g_1$ and $g_2$, $m_1$ and $m_2$ are the numbers of layers in the generative subnetworks $g_1$ and $g_2$. Note that $m_1$ needs not be equal to $m_2$. Use $\theta_{g_1^{(i)}}$ and $\theta_{g_2^{(i)}}$ to denote the learnable parameters for $g_1^{(i)}$ and $g_2^{(i)}$, respectively.

Through layers of perceptron operations, the generative subnetworks gradually decode information from more abstract concepts to more concrete details. The bottom layers decode high-level semantic information and the top layers decode low-level detail information. Note that this information flow is different than a discriminative deep neural network for the classification task. In the discriminative subnetwork, the bottom layers extract low-level features while the top layers extract high-level features.

Because corresponding images in different modalities share the same high-level semantic information, some embodiments force the bottom layers 420 of $g_1$ and $g_2$ to have identical structure and share the weights. That is $$\theta_{g_1^{(i)}} = \theta_{g_2^{(i)}}, \text{ for } i = 1, 2, \ldots, k, \quad (7)$$

where k is the number of shared layers. This weight-sharing constraint forces the high-level information is decoded in the same way by the generative networks $g_1$ and $g_2$. Some embodiments do not put additional constraints on the top layers. The constraints are allowed to learn to materialize the high-level semantic information in the best ways for the individual modalities.

Discriminative Subnetwork

The derivation of the discriminative subnetwork is similar to that for the generative subnetwork. Let $f_1$ and $f_2$ be the discriminative subnetworks of GAN1 and GAN2, which can be implemented as multilayer perceptrons:

$$f_1(x_1) = f_1^{(n1)}(f_1^{(n1-1)}(\ldots f_1^{(2)}(f_1^{(1)}(x_1)))), \text{ and} \quad (8)$$

$$f_2(x_2) = f_2^{(n2)}(f_2^{(n2-1)}(\ldots f_2^{(2)}(f_2^{(1)}(x_2)))), \quad (9)$$

where $f_1^{(i)}$ and $f_2^{(i)}$ are the ith layers of $f_1$ and $f_2$, and $n_1$ and $n_2$ are the numbers of layers of $f_1$ and $f_2$. Use $\theta_{f_1^{(i)}}$ and $\theta_{f_2^{(i)}}$ to denote the learnable parameters for $f_1^{(i)}$ and $f_2^{(i)}$, respectively.

The discriminative subnetworks map an input image to a probability score, estimating the probability that the input is drawn from the training data distributions. For these subnetworks, the bottom layers of the discriminative subnetworks extract low-level features, while the top layers extract high-level features. Because the input images are the realization of the same high-level semantics in two different modalities, some embodiments force the discriminative subnetworks $f_1$ and $f_2$ to have the same top layers 410, which is achieved by sharing the weights of the top layers of the two discriminative subnetworks via $$\theta_{f_1^{(n_1-i)}} = \theta_{f_2^{(n_2-i)}}, \text{ for } i = 0, 1, \ldots, l-1, \quad (10)$$

where l is the number of shared layers.

Training

By the way of analogy, the training of the CoGAN also corresponds to a constrained minimax game given by $$\max_{g_1, g_2} \min_{f_1, f_2} V_{DGAN}(f_1, f_2, g_1, g_2) \quad (11)$$

$$\text{subject to } \theta_{g_1^{(i)}} = \theta_{g_2^{(i)}}, \quad \text{for } i = 1, 2, \ldots, k$$

$$\theta_{f_1^{(n_1-i)}} = \theta_{f_2^{(n_2-i)}}, \quad \text{for } i = 0, 1, \ldots, l-1$$

where the value function $V_{DGAN}$ is $$V_{DGAN}(f_1, f_2, g_1, g_2) = \quad (12)$$
$$E_{x_1 : p_{X_1}}[-\log f_1(x_1)] + E_{z : p_Z}[-\log(1 - f_1(g_1(z)))] +$$
$$E_{x_2 : p_{X_2}}[-\log f_2(x_2)] + E_{z : p_Z}[-\log(1 - f_2(g_2(z)))].$$

In this game analogy, there are two teams and each team has two players. The generative subnetworks $g_1$ and $g_2$ forms a team and work together for synthesizing a pair of corresponding images in two different modalities for confusing the discriminative subnetworks $f_1$ and $f_2$. On the other hand, the discriminative subnetworks try to differentiate images drawn from the training data distribution in the respective modalities from those drawn from the respective generative subnetworks. The collaboration is established from the weight sharing constraints. Similar to the GAN framework, the training of the generative and discriminative subnetworks can be achieved by the back propagation algorithm with an alternating gradient update scheme.

In the CoGAN game, there are two teams and each team has two players. The generative subnetworks $g_1$ and $g_2$ form a team and work together for synthesizing a pair of corresponding images in two different modalities for confusing the discriminative subnetworks $f_1$ and $f_2$, respectively. The discriminative subnetworks try to differentiate images drawn from the training data distribution in the respective modalities from those drawn from the respective generative subnetworks. The collaboration is established from the weight sharing constraints. Similar to the GAN framework, the learning of the generative and discriminative subnetworks can be achieved by the back-propagation algorithm with alternating gradient update.

Figure 5A:
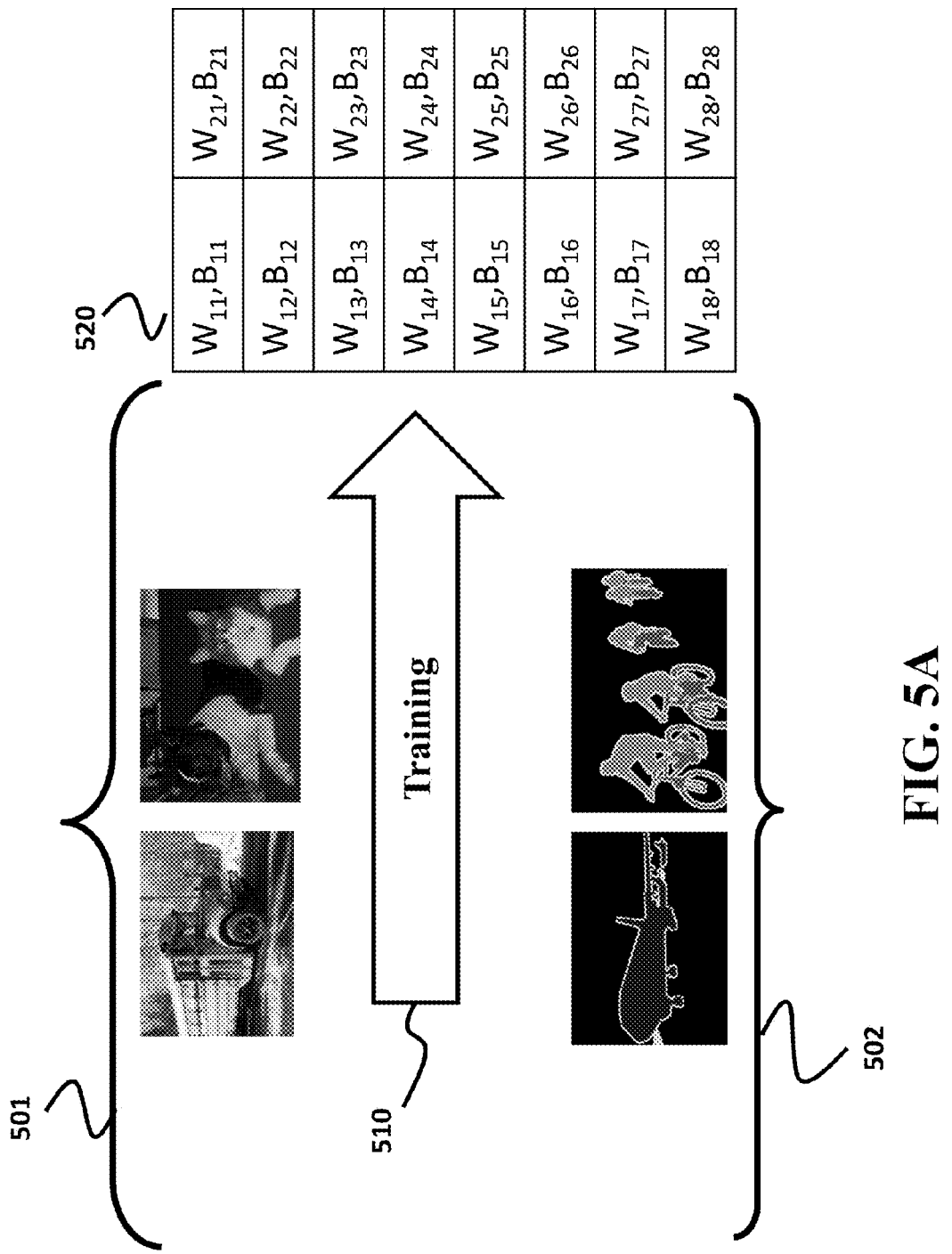
FIG. 5A is a schematic of neural networks training used by some embodiments.

FIG. 5A shows a schematic of neural networks training used by some embodiments of the invention. The training 510 uses a training set of images 501 and 502 of different modalities to produce the parameters 520 of the NNIG. Notably, the images 501 do not have to correspond to the images 502. In general, training an artificial-neural-network comprises applying a training algorithm, sometimes referred to as a "learning" algorithm, to an artificial-neural-network in view of a training set. A training set may include one or more sets of inputs and one or more sets of outputs with each set of inputs corresponding to a set of outputs. A set of outputs in a training set comprises a set of outputs that are desired for the artificial-neural-network to generate when the corresponding set of inputs is inputted to the artificial-neural-network and the artificial-neural-network is then operated in a feed-forward manner. Training the neural network involves computing the parameters, e.g., weight values associated with the connections in the artificial-neural-network.

FIG. 5B shows a pseudo code of the training 510 according to one embodiment of the invention. During the CoGAN training, the training samples are drawn independently from the marginal distributions in order not to rely on samples from the joint distribution, where one-to-one correspondences are available. In such a manner, the CoGAN trains generative subnetworks that can synthesize different modalities of the digital images in correspondence, but without having the correspondences in advance. The ability of learning the joint distribution from marginals can largely ease the burden of training data collection for pair image generation as acquiring corresponding images even in two different modalities can be very difficult.

Figure 5C:
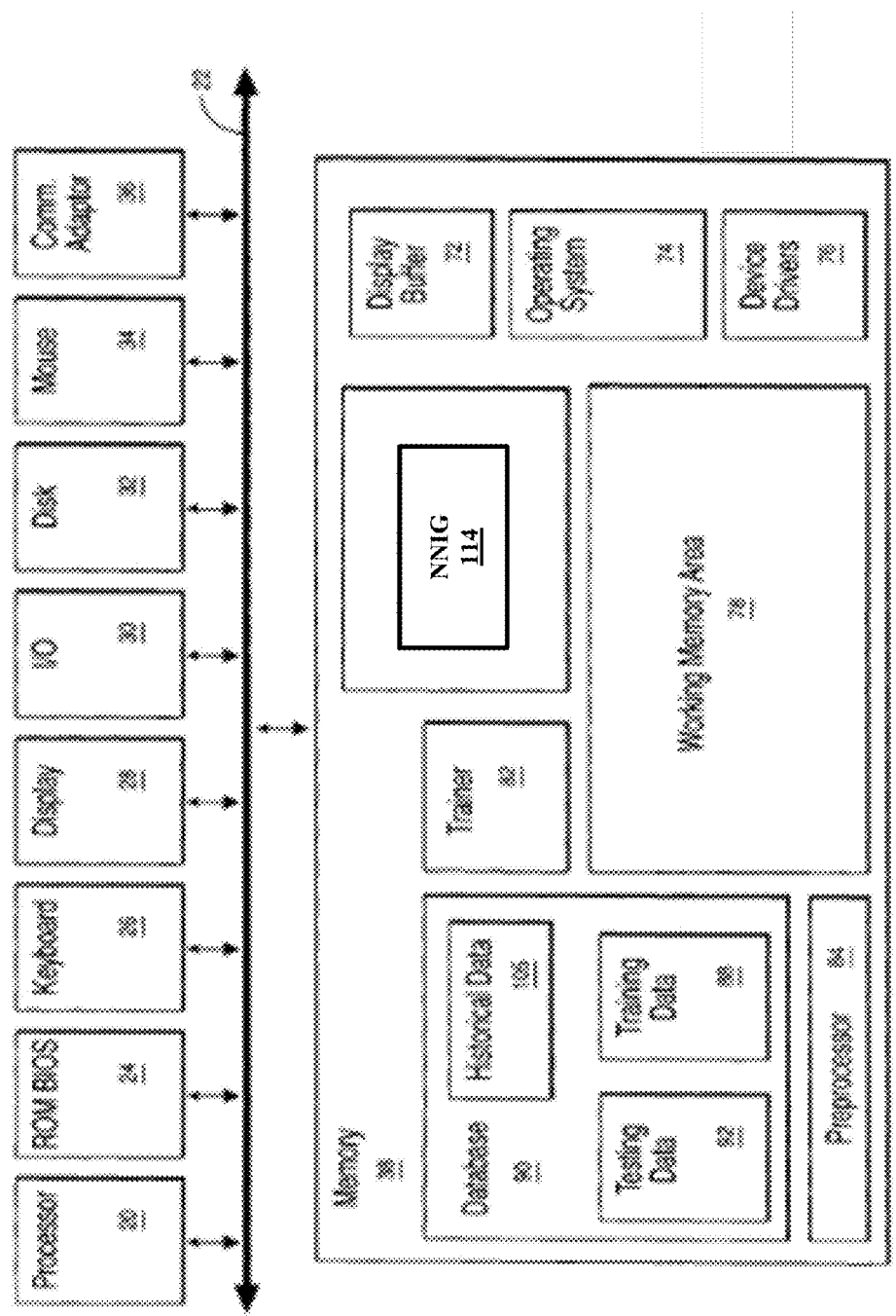
FIG. 5C is a block diagram of a training system according to one embodiment.

FIG. 5C shows a block diagram of a training system according to one embodiment of the invention. The training system includes a processor connected by a bus 22 to a read only memory (ROM) 24 and a memory 38. The training system can also include are a display 28 to present information to the user, and a plurality of input devices including a keyboard 26, mouse 34 and other devices that may be attached via input/output port 30. Other input devices such as other pointing devices or voice sensors or image sensors can also be attached. Other pointing devices include tablets, numeric keypads, touch screen, touch screen overlays, track balls, joy sticks, light pens, thumb wheels etc. The I/O 30 can be connected to communications lines, disk storage, input devices, output devices or other I/O equipment. The memory 38 includes a display buffer 72 that contains pixel intensity values for a display screen. The display 28 periodically reads the pixel values from the display buffer 72 displaying these values onto a display screen. The pixel intensity values may represent grey-levels or colors.

The memory 38 includes a database 90, trainer 82, the NNIG 114, preprocessor 84. The database 90 can include the historical data 105, training data, testing data 92. The database may also include results from operational, training or retaining modes of using the neural network. These elements have been described in detail above.

Also shown in memory 38 is the operating system 74. Examples of operating systems include AIX, OS/2, DOS, LINUX, and WINDOWS. Other elements shown in memory 38 include device drivers 76 which interpret the electrical signals generated by devices such as the keyboard and mouse. A working memory area 78 is also shown in memory 38. The working memory area 78 can be utilized by any of the elements shown in memory 38. The working memory area can be utilized by the neural network 101, trainer 82, the operating system 74 and other functions. The working memory area 78 may be partitioned amongst the elements and within an element. The working memory area 78 may be utilized for communication, buffering, temporary storage, or storage of data while a program is running.

Examples

The several examples provided in this disclosure illustrate that the NNIG trained by some embodiments using the CoGAN framework can generate different kind of the multimodal digital images in a purely unsupervised fashion and without relying on one-to-one correspondence between different modalities in the training data.

Generation of Digits

Figure 6C:
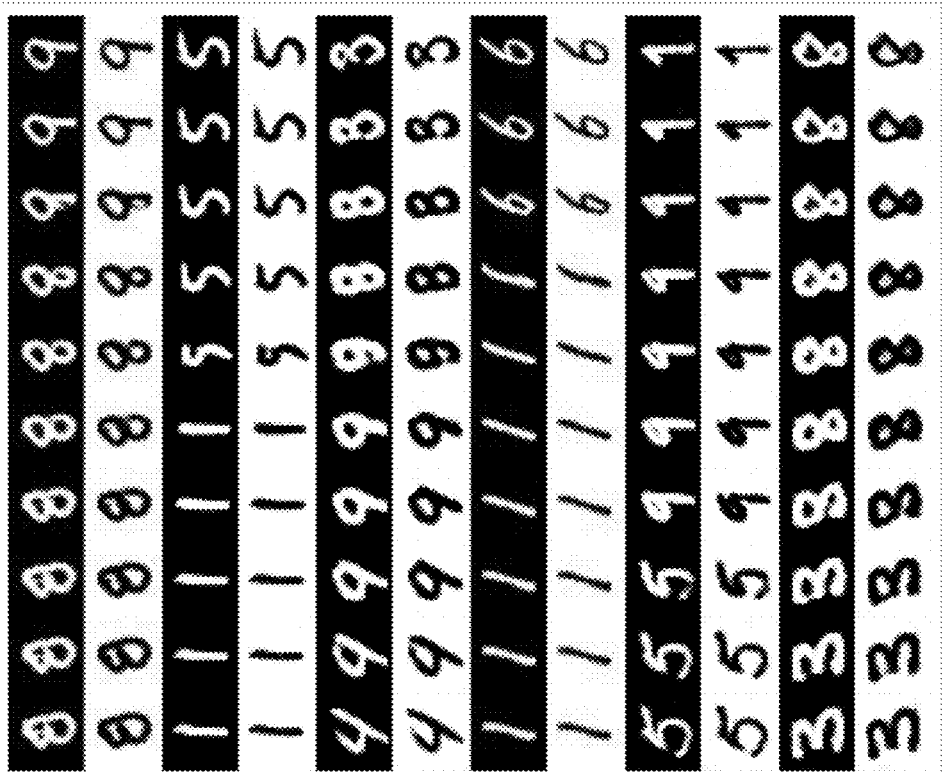
FIGS. 6B and 6C are visualizations of multimodal digital images generated by the neural network of FIG. 6A.
Figure 6B:
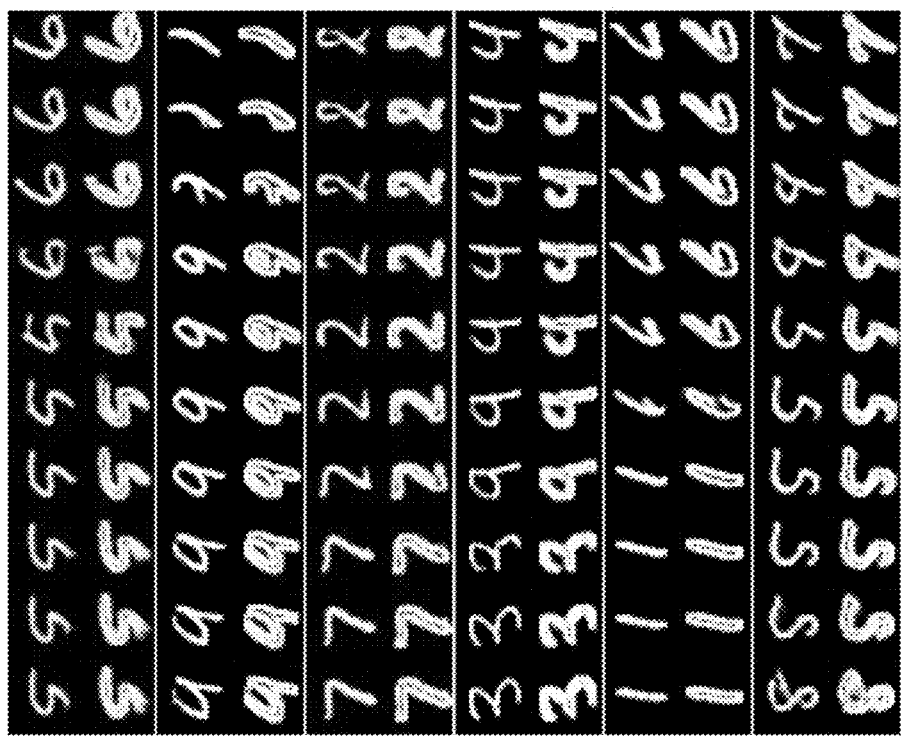

FIG. 6A shows example of structure 610 of generative and discriminative subnetworks for generating multimodal digital images of handwritten digits according to one embodiment. The embodiment uses 60000 training images in the training dataset to train CoGANs for generating digits in two different modalities including, e.g., generating a digit and its edge image and/or generating a digit and its negative image. For example, the first modality can include handwritten digit images, while the second modality can include their corresponding edge images. The examples of the multimodal digital images generated by some embodiments are shown in FIG. 6B. In another example, the two modalities include the handwritten digit images and their negatives images, respectively. The examples of those multimodal digital images generated by some embodiments are shown in FIG. 6C.

In the example of FIG. 6A, the two generative subnetworks had an identical structure; both had 5 layers and were fully convolutional. The stride lengths of the convolutional layers were fractional. The subnetworks also employed the batch normalization layers and the parameterized rectified linear unit layers. The generative subnetworks share the parameters for all the layers except for the last convolutional layers that were responsible for generating image outputs. The discriminative subnetworks use a variant of the LeNet. The inputs to the discriminative subnetworks are batches containing output images from the generative subnetworks and images from the two training subsets (each pixel value is linearly normalized to from 0 to 1). One implementation uses adaptive moment stochastic-gradient descent (ADAM) method to train the CoGAN for 25000 iterations.

Generation of Faces

FIG. 7A shows example of structure 710 of generative and discriminative subnetworks for generating multimodal face images with different attributes according to one embodiment. The embodiment trained the several CoGANs, each for generating a face image with an attribute and the corresponding face image without the attribute. The training dataset included 10177 people with 202599 face images. The training dataset covered large pose variations and background clutters. Each face image had 40 attributes, including eyeglass, smiling, and blond hair. The face images with an attribute formed the first modality of the digital image; and those without the attribute formed the second modality. There were no overlapping faces in the two modalities. In this example, the generative and discriminative subnetworks were both seven layers deep convolutional neural networks.

Figure 7B:
FIGS. 7B, 7C and 7D are visualizations of multimodal digital images generated by the neural network of FIG. 7A.
Figure 7C:
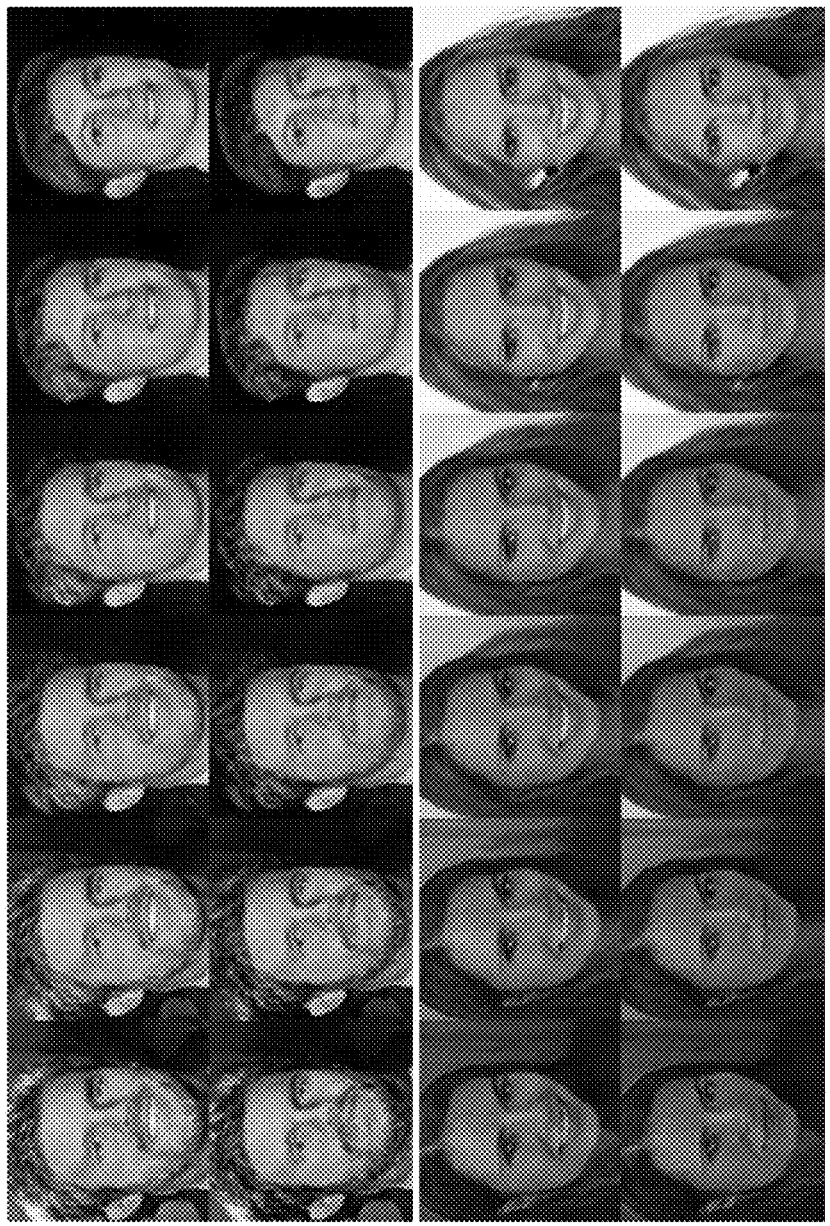
Figure 7D:

FIG. 7B shows examples of the multimodal images of faces with blond hair and with dark hair. FIG. 7C shows examples of the multimodal images of smiling and non-smiling faces. FIG. 7D shows examples of the multimodal images of faces with eyeglasses and without eyeglasses.

Some implementations randomly sampled two points in the 100-dimensional input space and visualized the deformation of the rendered faces as traveling from one pint to the other. Notably, the CoGAN generated pairs of corresponding faces, resembling those from the same person with different attributes. As traveling in the space, the faces can be gradually deformed, e.g., from one person to another. Such deformations are consistent for both modalities, which verified the CoGAN framework.

Generation of RGB and Depth Images

FIG. 8A show an example of a structure of generative and discriminative subnetworks for generating multimodal digital images including color images and its corresponding depth images according to one embodiment. Note that the rendered image pairs had two different modalities. The training dataset had RGBD images with registered color and depth images of 300 objects captured by a sensor from different viewpoints. The color images in the first subset were used for training the GAN1, while the depth images in the second subset were used for training the GAN2. There were no corresponding depth and color images in the two subsets. The images in the dataset have different resolutions.

Figure 8B:
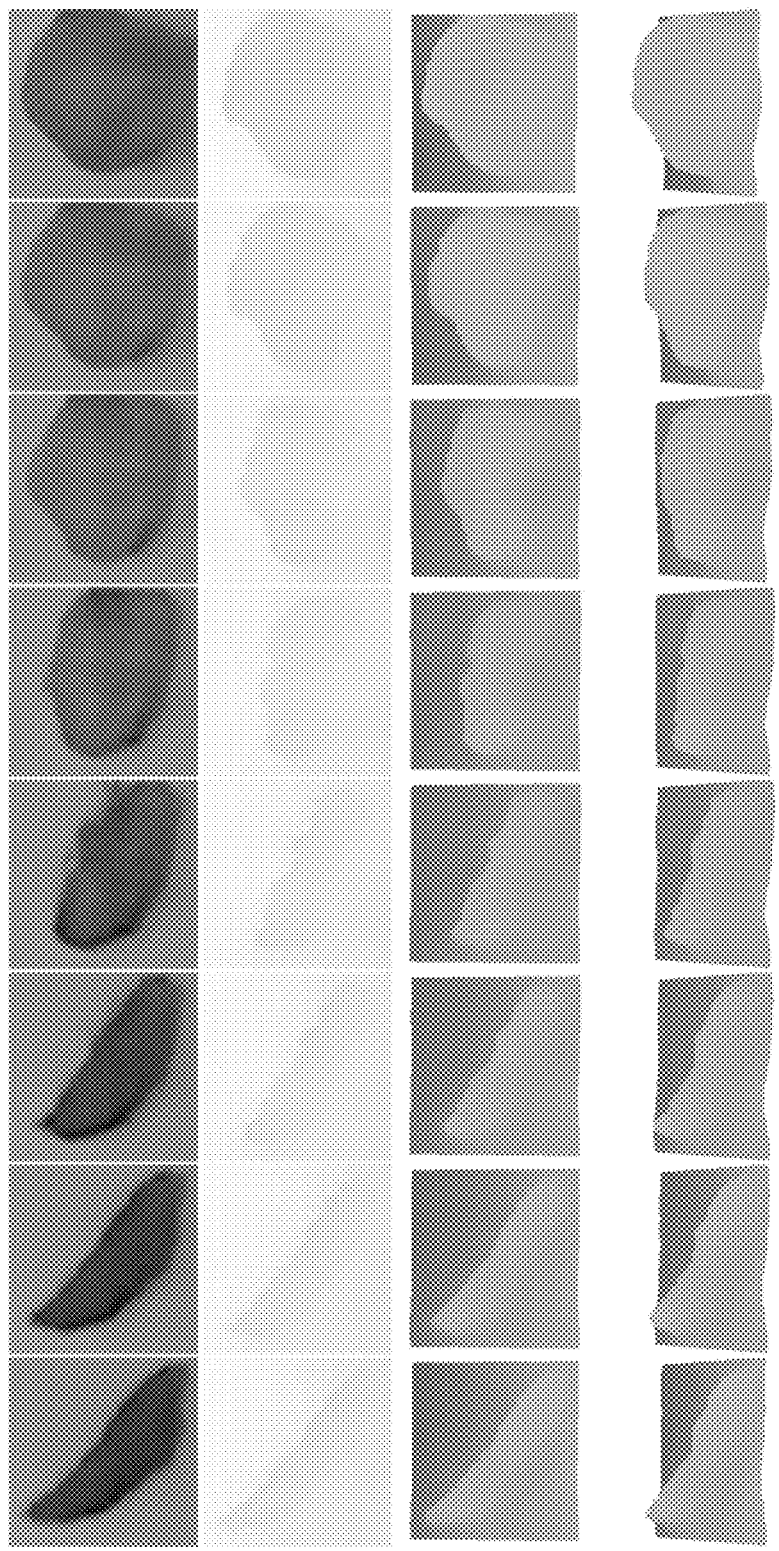
FIG. 8B is a visualization of multimodal digital images generated by the neural network of FIG. 8A.

FIG. 8B shows examples of the multimodal color and depth images. The rendered depth profile deformed smoothly, resembling real objects.

Applications

In addition to rendering multimodal digital images for movie and game production, the disclosed CoGAN framework finds applications in the modality transformation and modality adaptation tasks. Let $x_1$ be an image in the first modality. The modality transformation task is about finding the corresponding image in the second modality, $x_2$, such that the joint probability density $p(x_1,x_2)$ is maximized. Let L be a loss function measuring the difference between two images. Given the trained generative subnetworks $g_1$ and $g_2$, the transformation can be achieved by first solving $$z^* = \arg\min_z L(g_2(z), x_2)$$

After finding $z^*$, one can apply $g_2$, to obtain the transformed image, $x_2=g_2(z)$.

Figure 9:
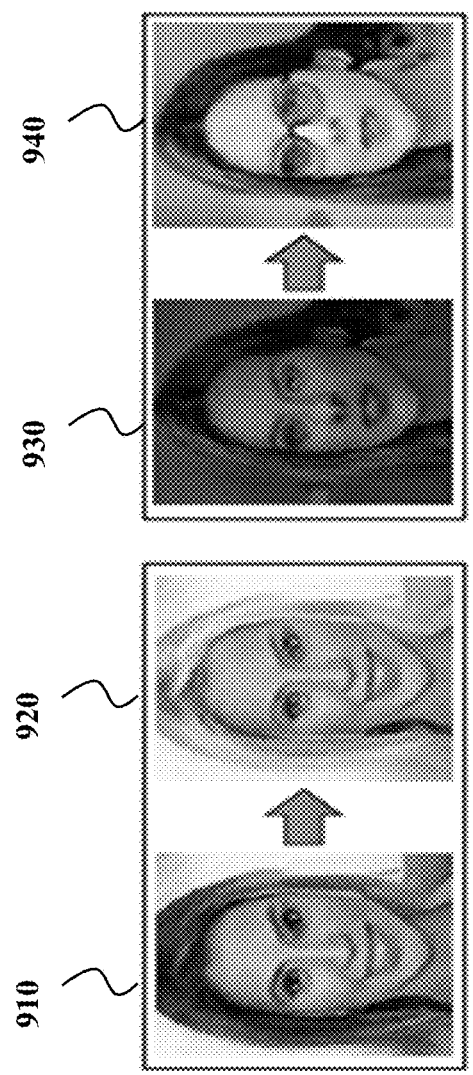
FIG. 9 is an example of a modality transformation according to some embodiments.

FIG. 9 shows example of modality transformation according to some embodiments. For example, the image 910 is transformed into the image 920, and the image 930 is transformed into the image 940. Those examples are computed by using the Euclidean distance (L2 loss) function and a Limited-memory BFGS (L-BFGS or LM-BFGS) optimization method.

Modality adaptation concerns adapting a classifier trained in one modality to the other. To that end, one embodiment uses of the CoGAN framework for an unsupervised modality adaptation task. Let $D_1$ and $D_2$ be the subsets of digit images in the first modality and second modality used in Task A. Assume that the class labels of the images in $D_1$ were known but the class labels of the images in $D_2$ were unknown. One goal was to adapt a digit classifier trained using $D_1$ to classify digits in the second modality. The CoGAN can be trained by jointly solving the digit classification problem in the first modality that used the images and labels in $D_1$ and the CoGAN learning problem that used the images in both $D_1$ and $D_2$. This produces two classifiers: $c_1(x_1)=c(f_1^{(3)}(f_1^{(2)}(f_1^{(1)}(x_1)))$ for the first modality and $c_2(x_2)=c(f_2^{(3)}(f_2^{(2)}(f_2^{(1)}(x_2)))$ for the second modality. Note that $f_2^{(2)}=f_1^{(2)}$ and $f_2^{(3)}=f_1^{(3)}$ due to weight sharing.

Additionally or alternatively, one embodiment creates a modality shift by transforming the Mixed National Institute of Standards and Technology database (MNIST) test images to their corresponding edge images. As applying $c_1$ to classify the edge images, the classification accuracy degraded to 87.0\% due to the modality shift. However, when applying $c_2$ to classify the images in the second modality, we obtained a classification accuracy of 96.7\%. The accuracy is close to that obtained in the first modality. This was surprising because neither labels in the second modality nor sample correspondence between the two modalities were used.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A computer-implemented method for generating a multimodal digital image, wherein the method uses a processor coupled with stored instructions implementing the method, wherein the instructions, when executed by the processor carry out steps of the method comprising:

acquiring an image of a scene indicative of features of the scene;

processing the image with a first neural network to produce a first image having a first modality; image;

processing the image with a second neural network to produce a second image having a second modality, such that the first image and the second image form the multimodal digital image, the wherein a structure and a number of layers of the first neural network are identical to a structure and a number of layers of the second neural network, wherein at least one layer in the first neural network has parameters identical to parameters of a corresponding layer in the second neural network, and wherein at least one layer in the first neural network has parameters different from parameters of a corresponding layer in the second neural network, wherein the layers of the first and the second neural networks having identical parameters produce high-level features of the first and the second images of the multimodal digital image, and wherein the layers of the first and the second neural networks having different parameters produce low-level features of the first and the second images of the multimodal digital image, wherein the first neural network and the second neural network are trained jointly while enforcing identical parameters for several bottom layers of the first neural network and the second neural network, wherein at least one or both of the first neural network and the second neural network are trained using generative adversarial nets (GAN) including a generative subnetwork for producing a sample of the digital image of a specific modality and a discriminative subnetwork for testing if the sample of the digital image produced by the generative subnetwork has the specific modality; and outputting the multimodal digital image.

2. The method of claim 1, further comprising:
randomly generating elements of the image using a probabilistic distribution.

3. The method of claim 1 wherein the low-level features are derived from the high level features.

4. The method of claim 1, wherein the digital image includes one or combination of an image, a video, a text, and a sound.

5. The method of claim 1, wherein a first generative subnetwork and a first discriminative subnetwork of the first neural network and a second generative subnetwork and a second discriminative subnetwork of the second neural network are jointly trained to minimize a minimax objective function.

6. The method of claim 1, further comprising:
rendering the first image of the first modality and the second image of the second modality on a display device or transmitting the first image of the first modality and the second image of the second modality over a communication channel.

7. The method of claim 1, wherein the first modality of the first image is a color image, and wherein the second modality of the second image is a depth image.

8. The method of claim 1, wherein the first modality of the first image is a color image, and wherein the second modality of the second image is a thermal image.

9. The method of claim 1, wherein the first modality of the first image is an image having a first style, and wherein the second modality of the second image is an image having a second style.

10. The method of claim 1, wherein the first neural network and the second neural network are selected from a set of the neural networks jointly trained to produce a set of modalities of the digital image, comprising:
processing the image with a set of neural networks to produce the multimodal digital image.

11. The method of claim 10, wherein the set of the neural networks forms a Coupled Generative Adversarial Nets (CoGAN).

12. A system for generating a multimodal digital image, comprising:

an input interface to acquire an image of a scene indicative of features of the scene;

at least one non-transitory computer readable memory storing a first neural network trained to produce a first modality of the multimodal digital image and a second neural network trained to produce a second modality of the multimodal digital image, wherein a structure and a number of layers of the first neural network are identical to a structure and a number of layers of the second neural network, wherein at least one layer in the first neural network has parameters identical to parameters of a corresponding layer in the second neural network, and wherein at least one layer in the first neural network has parameters different from parameters of a corresponding layer in the second neural network, wherein the layers of the first and the second neural networks having identical parameters produce high-level features of the first and the second images of the multimodal digital image, and wherein the layers of the first and the second neural networks having different parameters produce low-level features of the first and the second images of the multimodal digital image, wherein the first neural network and the second neural network are trained jointly while enforcing identical parameters for several bottom layers of the first neural network and the second neural network, wherein at least one or both of the first neural network and the second neural network are trained using generative adversarial nets (GAN) including a generative subnetwork for producing a sample of the digital image of a specific modality and a discriminative subnetwork for testing if the sample of the digital image produced by the generative subnetwork has the specific modality;

a processor to generate the multimodal digital image by processing the image with the first neural network to produce a first modality of a first image and processing the image with the second neural network to produce a second modality of a second image, such that the first image and the second image form the multimodal digital image; and an output interface to output the multimodal digital image.

13. The system of claim 12, further comprising:

a display device for displaying the multimodal digital image, such that the output interface outputs the multimodal digital image to the display device.

14. The system of claim 12, wherein the high-level features are attributed to entire digital image and the low-level features are attributed to a portion of the digital image.

15. The system of claim 12, wherein the first modality of the first image is a color image, and wherein the second modality of the second image is a depth image or a thermal image.

16. The system of claim 12, wherein the first modality of the first image is an image having a first style, and wherein the second modality of the second image is an image having a second style.

17. A non-transitory computer-readable medium with instructions stored thereon, that when executed by a processor, perform the steps comprising:

acquiring an image of a scene indicative of features of the scene;

processing the image with a first neural network to produce a first image having a first modality; image;

processing the image with a second neural network to produce a second image having a second modality, such that the first image and the second image form the multimodal digital image, the wherein a structure and a number of layers of the first neural network are identical to a structure and a number of layers of the second neural network, wherein at least one layer in the first neural network has parameters identical to parameters of a corresponding layer in the second neural network, and wherein at least one layer in the first neural network has parameters different from parameters of a corresponding layer in the second neural network, wherein the layers of the first and the second neural networks having identical parameters produce high-level features of the first and the second images of the multimodal digital image, and wherein the layers of the first and the second neural networks having different parameters produce low-level features of the first and the second images of the multimodal digital image, wherein the first neural network and the second neural network are trained jointly while enforcing identical parameters for several bottom layers of the first neural network and the second neural network, wherein at least one or both of the first neural network and the second neural network are trained using generative adversarial nets (GAN) including a generative subnetwork for producing a sample of the digital image of a specific modality and a discriminative subnetwork for testing if the sample of the digital image produced by the generative subnetwork has the specific modality; and outputting the multimodal digital image.

* * * * *